Oct. 18, 1966  R. W. BLACKBURN  3,280,000
MODERATOR DUMP GATES
Filed Jan. 27, 1965  2 Sheets-Sheet 1

United States Patent Office 3,280,000
Patented Oct. 18, 1966

3,280,000
MODERATOR DUMP GATES
Robert W. Blackburn, Ottawa, Ontario, Canada, assignor to Atomic Energy of Canada Limited, Ottawa, Ontario, Canada, a corporation of Canada
Filed Jan. 27, 1965, Ser. No. 428,518
8 Claims. (Cl. 176—27)

This invention relates to nuclear reactors and has particular reference to the structure of a reactor using heavy water as the moderator and working substance.

A reactor of this particular type has been described in U.S. Patent 3,001,923 issued September 26, 1961, in the name of P. R. Tunnicliffe, Ernest Siddall, Melville Douglas Berry and Stanley James Whittaker. Such a reactor basically comprises a core having coolant channels into which natural uranium fuel rods can be placed. The channels are arranged in a tank called a calandria and heavy water is introduced into the center tubed region of the calandria as a neutron moderator and into the outer annular region of the calandria as a neutron reflector. Heavy water is also passed through the channels for cooling of the rods.

In this type of apparatus it is necessary to allow dumping of the moderator from the calandria should rapid shutdown of the reactor be required. In Patent 3,001,923 it is explained that helium is introduced under pressure to a tank beneath the calandria so that a stable helium/heavy water interface is produced in a manometer type section between calandria and tank and the water is held within the calandria. When rapid shutdown is needed the helium pressure is released and the water flows through the manometer section into the tank. While this system is basically satisfactory, it does have some drawbacks. Thus where the dump port section projects into the calandria the reflector efficiency is reduced. The structure of the dump port manometer section must be quite complex in order to obtain stable interface between the moderator and the pressure balancing gas, and as a result costs of construction are high. A heavy water spray cooling system is necessary to remove radiation-induced heat from the dump port section. Because the dump port structure includes a tortuous flow path (to obtain stable liquid/gas interface), there is a relatively high hydraulic loss coefficient and large flow area requirement.

It is an object of the present invention to overcome these disadvantages and to provide a dump port which is simple, of low initial cost, with high reliability, and with a low hydraulic loss coefficient when in operation.

Figure 1:
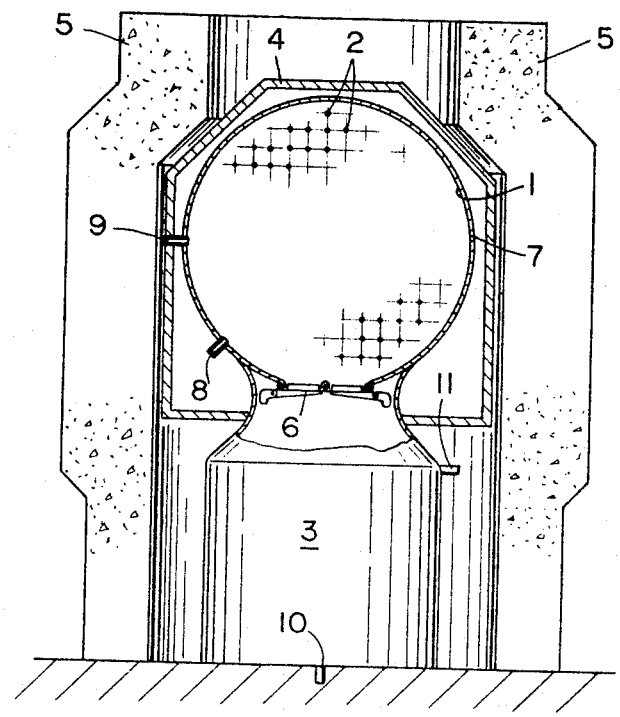
Figure 5:
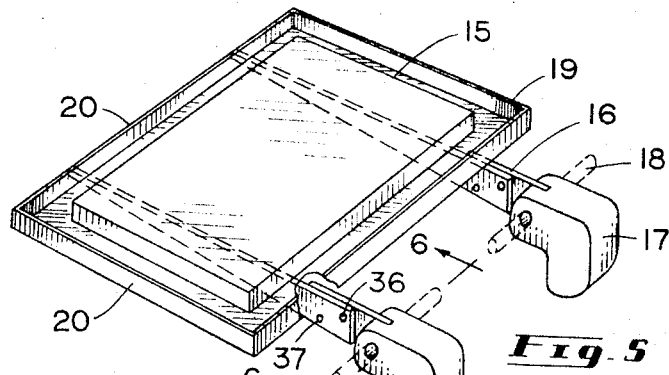
Figure 6:
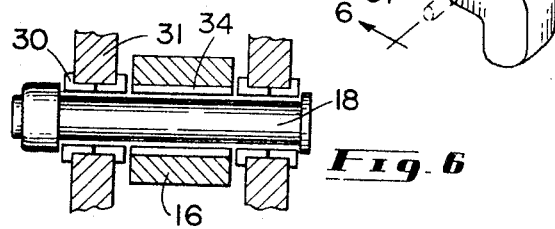
Figure 2:
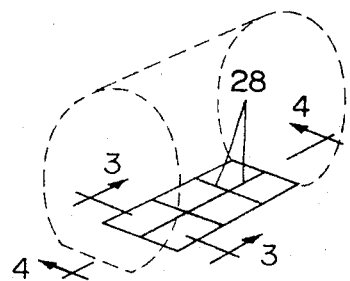
Figure 3:
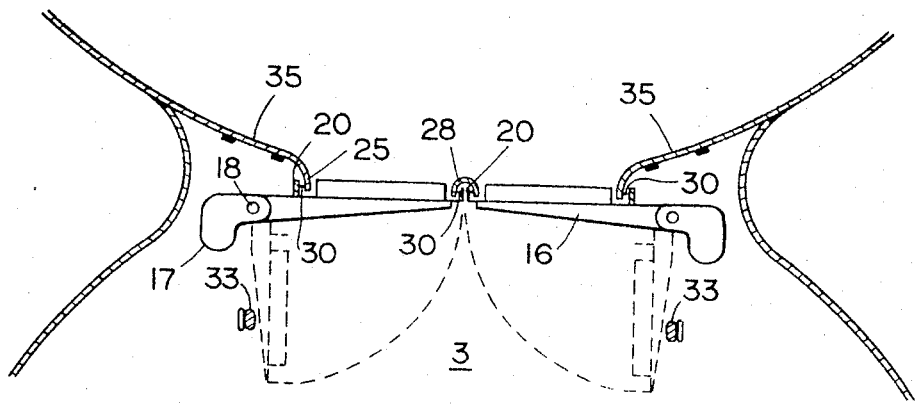
Figure 4:
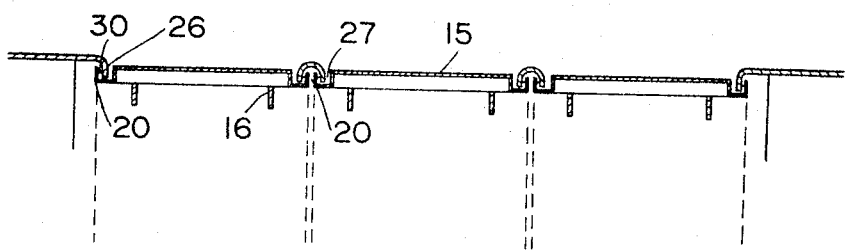

The invention will now be described with reference to the accompanying drawings in which:

FIGURE 1 shows a general end sectional view of a reactor assembly with associated calandria and dump tank in which the invention is embodied, FIGURE 2 shows a perspective view of the calandria dump floor, FIGURE 3 is an enlarged end sectional view of the dump gates along line 3—3 of FIGURE 2, FIGURE 4 shows a side sectional view of the gates of FIGURE 3, along line 4—4 of FIGURE 2, FIGURE 5 shows a perspective view of one of the gates of FIGURES 3 and 4, FIGURE 6 shows a sectional view of a bearing assembly for the gates.

With reference now to FIGURE 1, a reactor calandria 1 contains a plurality of fuel channels 2 into which fuel rods can be placed and through which cooling heavy water can be passed. Beneath the calandria 1 is a dump tank 3 and surrounding the calandria is a thermal shield 4 and biological shield 5. The calandria is connected to the dump tank 3 through dump gates 6. The outer annular region 7 of the calandria contains the heavy water reflector. Heavy water can be led into the base of the calandria by means of a port 8 and withdrawn from it through a port 9. Other heavy water can be led through the coolant channels 2 by means not shown. Water in the dump tank 3 can be removed through a port 10 and returned to the calandria. There is a further port 11 for the release of the pressurized helium present within the tank 3.

Referring now to FIGURES 2, 3, 4 and 5, the structure of the novel dump gates 6 can be seen. The gates close the base of the calandria and comprise plates 15 supported on pivoted arms 16 which are counter-weighted at 17 and are free to rotate about axles 18. The perimeters of the plates 15 are trough-formed at 19, the troughs include upturned lips 20 which cooperate with the downwardly depending lips 25 and 26 at the bottom edges of the calandria and the lips on longitudinal and transverse separators 27 and 28 between the gates. When the calandria is filled with heavy water and a proper compensating helium pressure is developed within the dump tank 3, a liquid/gas interface forms in the slot between lips 20 and 25, 26, 27 or 28 respectively. This interface is shown at 30 in the drawings.

As explained in the above mentioned Patent 3,001,923 it is necessary that the interface be formed in order to retain the water within the calandria, but under some circumstances a continuous bleed of water through the manometer section may be permitted. In this invention bleed would take place over the dam formed by lip 20 or through the port 9.

The gates 6 are normally held closed against the weight of heavy water in the calandria by the pressure present in the dump tank but when rapid shut down is required the release of the helium pressure within tank 3 causes the weight of water within the calandria to open the doors 6 which will remain open, held by the inertia of the moving water, either until the calandria is empty or until the dump tank is full. Since the gates are counter-balanced they will return to their normal horizontal position after having dumped the heavy water load. In general it is arranged that the dump tank capacity is just sufficient that the heavy water will drain to a level low enough to render the reactor sub-critical under all possible conditions of fuel loading. The advantage of this is that some water remains within the calandria to reduce the time required to return the moderator to a critical level when reactor startup is desired.

This system of sealing the bottom of the calandria is efficient and affords very low hydrodynamic losses during periods when water is flowing out of the calandria. The gates are wide open at this time and effectively the bottom of the calandria is open to the dump tank. The tortuous path necessary to maintain the liquid/gas interface is only present during normal operation of the reactor when flow through the path is small.

FIGURE 2 shows a general layout in which there are six dump gates along the base of a calandria.

In FIGURE 6 the bearing structure for each of the pivots 18 shown comprises insert journal bearings 30 which are pushed into the supporting frame work 31 which in turn is suitably fastened to the inner wall of the dump tank 3. A bearing 34 is also located in each pivoted arm 16. These bearings are non-lubricated plain journal type with low unit loadings and generous clearances. All materials used in the gates and their bearings must be compatible with mating materials and with the deuterium-oxide-saturated helium, high radiation field environment. A snubber 33 (FIGURE 3) can be arranged to arrest the gates upon opening by encountering arms 16. The snubbers are mounted on the dump tank 3. In order that the bearings may be inspected and serviced if necessary, inspection doors 35 are placed in the base of the calandria. These openings would be accessible through capped penetrations at the top of the calandria (not shown) through which a borescope or tube could be inserted past the calandria tubes into the gate region for inspection. The possibility of deformation of the gates causing malfunction is minimized because there is no metallic contact between the gate and the dump port opening. If it is thought that seizure of the pivots 18 and bearings 34 could occur in any particular reactor, the arm 16 may include a weak link consisting of a pivot pin 36 and shear pin 37 so that abnormally high loads on the gate would cause the pin 37 to shear and the gate to open by pivoting on pin 36.

The structure made in accordance with the teachings of the invention is very simple and provides a greater area of egress for water for a given dump port section area in the calandria. Thus for a given flow rate the interference with the deuterium oxide reflector is smaller than with the standard manometer system heretofore employed. The increase in reflector efficiency results in increased overall fuel burn-up and consequent reduction in operating costs.

I claim:

1. In a nuclear reactor comprising a calandria and a dump tank beneath the calandria, and adapted to receive a working volume of moderator liquid within the calandria, with a sustaining gas pressure within the dump tank, and including interface means for separating said liquid and said gas, said interface means comprising, a dump gate at the base of said calandria, said gate forming a supporting surface for said liquid and defining a seal with the base of said calandria, said seal comprising a manometer tube section separating liquid in said calandria and gas in said dump tank, pressure release in said tank upsetting equilibrium balance between pressure of said sustaining gas and pressure of said liquid on said gate, opening said gate, and discharging liquid from said calandria into said tank.

2. Apparatus as defined in claim 1 comprising counterbalance means for said gate for biassing said gate towards closing position.

3. Apparatus as defined in claim 1 comprising a pivot shaft for said gate and a journal bearing for said shaft.

4. Apparatus as defined in claim 1, said gate comprising a rim trough section, walls to said trough section, a depending flange on said calandria surrounding said gate and dipping into said trough below the uppermost parts of said walls to define a manometer section across the trough section of said gate.

5. Apparatus as defined in claim 4 comprising a plurality of gates, the area of said gates being greater than the area of flow required for emergency shut down of said reactor.

6. Apparatus as defined in claim 1 comprising supporting means for said gate, and weak link means in said support means permitting failure of said supporting means.

7. Apparatus as defined in claim 6 said weak link comprising a pivot pin and a shear pin in said supporting means.

8. Apparatus as defined in claim 2 comprising a pivot shaft for said gate and a journal bearing for said shaft.

References Cited by the Examiner
UNITED STATES PATENTS

| | | | |
|---|---|---|---|
| 3,001,923 | 9/1961 | Tunnicliffe et al. | 176—52 |
| 3,193,123 | 6/1965 | Costes et al. | 176—22 X |

REUBEN EPSTEIN, *Primary Examiner.*